United States Patent Office 3,472,833

Patented Oct. 14, 1969

3,472,833

DISAZO DYESTUFFS CONTAINING A VINYLSULFONYLETHYL TETRAHYDROQUINOLINE RADICAL

Max A. Weaver, James M. Straley, and John I. Dale III, Kingsport, Tenn., assignors to Eastman Kodak Company, Rochester, N.Y., a corporation of New Jersey No Drawing. Filed Aug. 26, 1965, Ser. No. 482,891

Int. Cl. C09b *31/14;* D06p *1/18*

U.S. Cl. 260—155 10 Claims

ABSTRACT OF THE DISCLOSURE

Azobenzene-azo-tetrahydroquinoline compounds having a vinylsulfonylethyl group attached to the nitrogen atom of the tetrahydroquinoline group are useful as dyes for hydrophobic textile materials.

This invention relates to novel compounds containing a vinylsulfonylethyl tetrahydroquinoline radical, and more particularly to disazo compounds, such as disazo dyestuffs, containing a vinylsulfonylethyl tetrahydroquinoline radical. Particular disazo compounds containing this radical include compounds obtained by coupling diazotized 4-aminoazobenzene compounds with vinylsulfonylethyl tetrahydroquinoline coupling components.

The disazo compounds of the invention have the general formula (I)

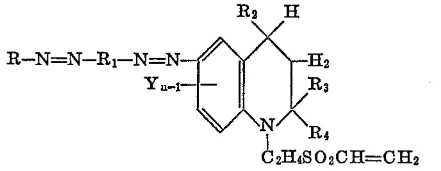

wherein R represents a monocyclic carbocyclic aromatic group of the benzene series including phenyl and substituted phenyl such as alkylphenyl, e.g. o,m,p-tolyl; alkoxyphenyl, e.g. o,m,p-methoxyphenyl; halophenyl, e.g. o,m,p-chlorophenyl; nitrophenyl, e.g. o,m,p-nitrophenyl, alkylsulfonylphenyl, e.g. o,m,p-methylsulfonylphenyl; alkylsulfonamidophenyl e.g. o,m,p-methylsulfonamidophenyl; di(alkylsulfonyl)phenyl, e.g. 2,5-di(methylsulfonyl)-phenyl; dicarboxylicacidimidophenyl, e.g. o,m-succinimidophenyl; fluoroalkylphenyl, e.g. trifluoromethylphenyl; acylamidophenyl, e.g. o,m,p-acetamidophenyl; cyanophenyl, e.g. o,m,p-cyanophenyl; carboxamidophenyl, e.g. o,m,p-carboxamidophenyl; benzamidophenyl; thiocyanophenyl, e.g. o,m,p-thiocyanophenyl; alkylthiophenyl, e.g. o,m,p-methylthiophenyl; benzoxyphenyl, e.g. o,m,p-benzoxyphenyl; benzaminophenyl, e.g. o,m,p-benzaminophenyl; benzylaminophenyl e.g. o,m,p - benzylaminophenyl; N-alkylbenzaminophenyl, e.g. N-phenylmethylaminophenyl; formylphenyl, e.g. o,m,p-formylphenyl; carbalkoxyphenyl, e.g. o,m,p-carbethoxyphenyl; benzoylphenyl, e.g. o,m,p-benzoylphenyl;

$R_1$ represents a monocyclic carbocyclic aromatic group of the benzene series including p-phenylene and p-phenylene substituted with lower alkyl, e.g. o,m-methyl-p-phenylene; lower alkoxy, e.g. o,m-methoxy-p-phenylene; halogen, e.g. o,m-chloro-p-phenylene; lower alkylthio, e.g. o,m-methylthio-p-phenylene; lower alkanoylamido, e.g. o,m-acetamido-p-phenylene; benzamido; or lower alkylsulfonamido, e.g. o,m-methylsulfonamido-p-phenylene.

$R_2$, $R_3$ and $R_4$ each represent a hydrogen atom or a lower alkyl group of 1 to 4 carbon atoms, particularly methyl;

$Y_{n-1}$ represents the substituents in at least one of the 5-, 7- or 8-positions of the tetrahydroquinoline nucleus wherein Y is either a lower alkyl group of 1 to 4 carbon atoms, particularly methyl; a lower alkoxy group of 1 to 4 carbon atoms, particularly methoxy; or a halogen atom, including a chlorine atom or a bromine atom; or lower alkanoylamido, e.g. acetamido;

$n$=a positive integer from 1 to 4.

The 4-aminoazobenzene compounds which are diazotized and coupled with the mentioned coupling components are substituted and nonsubstituted 4-aminoazobenzenes such as, for example, 4-aminoazobenzene, 4-aminoalkylazobenzenes, 4-aminoalkoxyazobenzenes, 4-aminohaloazobenzenes and the substituted 4-aminoazobenzenes described in the examples and table below.

The vinylsulfonylethyl tetrahydroquinoline coupling components of the invention which are coupled with the disazo compounds have the following general formula (II)

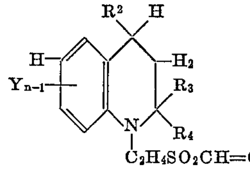

wherein $R_2$, $R_3$, $R_4$, Y and $n$ have the same meaning as given above.

Exemplary vinylsulfonylethyl tetrahydroquinolines of the above general formula include, for example, N-vinylsulfonylethyl-1,2,3,4-tetrahydroquinoline
N-vinylsulfonylethyl-2,2,4-trimethyl-1,2,3,4-tetrahydroquinoline
N-vinylsulfonylethyl-2,2,4,7-tetramethyl-1,2,3,4-tetrahydroquinoline
N-vinylsulfonylethyl-2,7-dimethyl-1,2,3,4-tetrahydroquinoline
N-vinylsulfonylethyl-2-methyl-1,2,3,4-tetrahydroquinoline
N-vinylsulfonylethyl-2-isopropyl-7-methoxy-1,2,3,4-tetrahydroquinoline The coupling components are prepared by the reaction of the appropriately substituted tetrahydroquinoline with divinyl sulfone in the presence of acetic acid and an inert solvent as will be more particularly described hereinafter.

The disazo compounds can be used for dyeing textile materials including synthetic polymer fibers, yarns and fabrics giving fast orange to violet shades when applied by conventional dyeing methods to cellulose ester and polyester fibers. The azo compounds have excellent affinity for polyamide fibers. When the azo compounds are used for dyeing hydrophobic materials, they should be free of water-solubilizing groups such as sulfo and carboxyl groups. In general, the dyes have good fastness, for example, to light, washing, gas (atmospheric fumes) and sublimation. The dyes are useful in application and discharge printing.

The following examples will serve to illustrate the preparation of representative intermediates and disazo compound of our invention.

Preparation of vinylsulfonylethyl tetrahydroquinoline couplers

Preparation of 2,7-dimethyl-1(2-vinylsulfonyl-ethylethyl)-1,2,3,4-tetrahydroquinoline.

An amount of 80.5 g. 2,7-dimethyl-1,2,3,4-tetrahydroquinoline, 65 g. divinylsulfone, 200 ml. toluene, and 10 ml. acetic acid were heated together at reflux for 24 hr. The solvent was removed and the product, distilled under vacuum, had a B.P. of 199–207° C. at 1.1 to 1.5 mm. Hg.

The coupler has the structure:

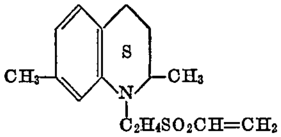

In accordance with the method set forth above, the following table describes the coupling components which were prepared by reacting the appropriate 1,2,3,4-tetrahydroquinoline with divinylsulfone.

TABLE

| Tetrahydroquinoline reactant | Structure |
|---|---|
| 2,2,4,7-tetramethyl-1-(2-vinylsulfonylethyl)-1,2,3,4-tetrahydroquinoline. | 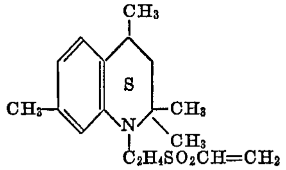 |
| 1-(2-vinylsulfonylethyl)-1,2,3,4-tetrahydroquinoline. | 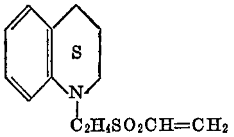 |
| 7-methoxy-1-(2-vinylsulfonylethyl)-1,2,3,4-tetrahydroquinoline. | 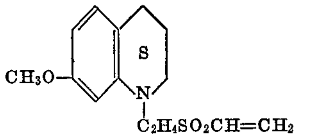 |
| 7-chloro-1-(2-vinylsulfonylethyl)-1,2,3,4-tetrahydroquinoline. | 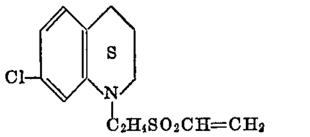 |

EXAMPLES OF THE DYES

Example 1

A solution of nitrosyl sulfuric acid was prepared by the careful addition of 0.72 g. $NaNO_2$ to 5 ml. conc. $H_2SO_4$. This solution was cooled to about 0° C. and 10 ml. 1:5 acid (1 part propionic:5 parts acetic) was added below 15° C. Then, at below 5° C., 1.97 g. p-phenylazoaniline was added, followed by 10 ml. 1:15 acid. The reaction was stirred two hours at 0–5° C., then added to a solution of 2.81 g. 2,7-dimethyl-1-(2-vinylsulfonylethyl)-1,2,3,4-tetrahydroquinoline dissolved in 50 ml. 1:5 acid at about 5° C. Solid ammonium acetate was added until the solution turned Congo red paper brown. The coupling was continued at this temperature for 2 hrs., then drowned with water, filtered, washed with water, and dried. The product dyes nylon and polyester fibers bright red shades of excellent fastness. This dye has the following structure:

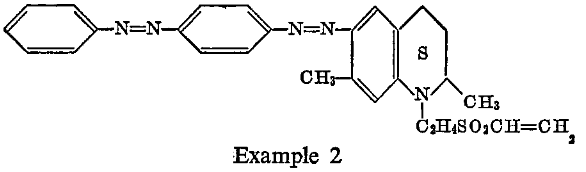

Example 2

An amount of 1.97 g. p-phenylazoaniline was diasotized using the procedure described in Example 1, and the diazonium solution was added to a solution of 3.07 g. 2,2,4,7-tetramethyl-1-(2-vinylsulfonylethyl)- 1,2,3,4-tetrahydroquinoline in 50 ml. 1:5 acid at about 5° C. Solid ammonium acetate was added until the solution turned Congo red paper brown. The coupling was continued for 2 hrs. at ice-bath temperature, then drowned with water, filtered, washed with water, and air dried. The product dyes nylon and polyester fibers red shades. It has the structure:

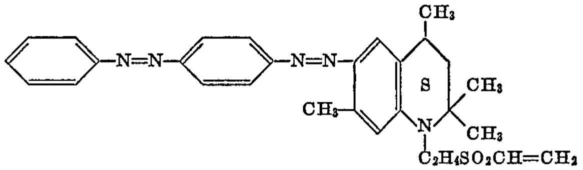

Example 3

An amount of 1.97 g. p-phenylazoaniline was diazotized and coupled with 2.51 g. 1-(2-vinylsulfonylethyl)-1,2,3,4-tetrahydroquinoline using the procedure described in Example 1. The dye colors nylon and polyester fibers bright shades or orange and has the following structure:

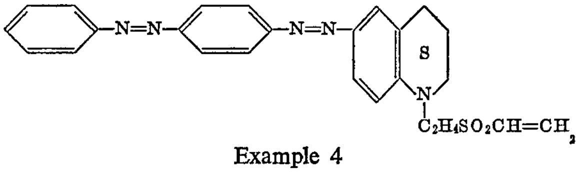

Example 4

An amount of 0.72 g. $NaNO_2$ was added portionwise to 5 ml. conc. $H_2SO_4$. This solution was cooled to about 5° C. and 10 ml. 1:5 acid was added below 15° C. Then 2.25 g. 4-amino-2′,3-dimethylazobenzene was added, followed by 10 ml. 1:5 acid, all below 5° C. After stirring at 0–5° C. for 2 hrs., the diazonium solution was added to a solution of 2.81 g. 2,7-dimethyl-1-(2-vinylsulfonylethyl)-1,2,3,4-tetrahydroquinoline dissolved in 50 ml. 1:5 acid at about 5° C. Solid ammonium acetate was added until the solution turned Congo red paper brown. The coupling was continued at this temperature for 2 hours. then drowned with water, filtered, washed with water, and air dried. The product dyes nylon a bright shade of red and has the following structure:

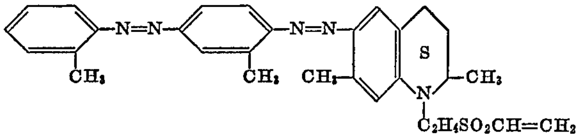

Example 5

An amount of 3.14 g. 3′-acetamide-4-amino-2,5-dimethoxyazobenzene was diazotized and coupled with 2.81 g. 2,7-dimethyl-1-(2 - vinylsulfonylethyl)-1,2,3,4-tetrahydroquinoline using the same procedure and quantities of reagents as in Example 1. The product dyes nylon and polyester fibers violet shades and has the following structure:

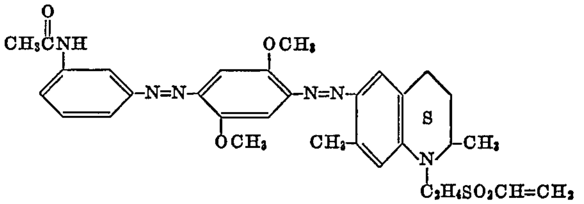

Example 6

An amount of 2.31 g. 4-amino-3-chloroazobenzene was diazotized and coupled with 2.51 g. 1-(2-vinylsulfonylethyl)-1,2,3,4-tetrahydroquinoline using the same procedure and quantities of reagents as in Example 1 to give a dye which dyes nylon and wool bright orange shades. It has the following structure:

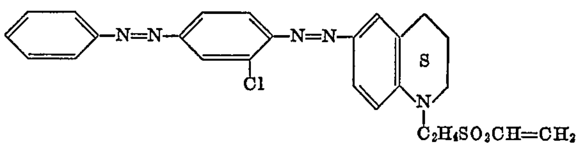

Example 7

An amount of 2.87 g. 4-amino-2,5-dimethoxy-3'-hydroxymethylazobenzene was diazotized and coupled with 2.81 g. 7-methoxy-1-(2-vinylsulfonylethyl)-1,2,3,4-tetrahydroquinoline using the same procedure and quantities of reagents as in Example 1. The dye obtained from this reaction dyes nylon, wool and polyester fibers blue-violet shades. It has the following structure;

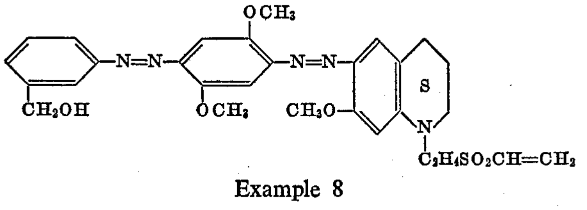

Example 8

An amount of 1.97 g. p-phenylazoaniline was diazotized and coupled with 2.85 g. 7-chloro-1-(2-vinylsulfonylethyl)-1,2,3,4-tetrahydroquinoline using the procedure described in Example 1. The dye obtained dyes nylon and wool bright orange-red shades with good fastness properties. It has the structure:

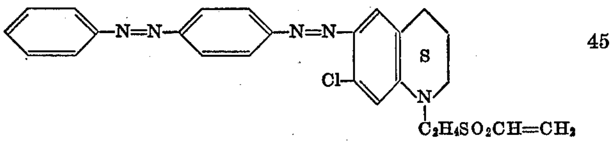

Example 9

An amount of 2.31 g. 4-amino-3-chloroazobenzene was diazotized and coupled with 3.07 g. 2,2,4,7-tetramethyl-1-(2-vinylsulfonylethyl)-1,2,3,4-tetrahydroquinoline, using the same procedure and quantities of reagents as in Example 1, to give a dye which dyes the nylon bright red shades. It has the structure:

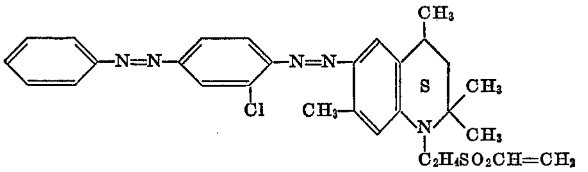

The disazo compounds of the following table were prepared by the method illustrated in Examples 1–8, above. Thus, the diazonium salts were coupled with the tetrahydroquinoline couplers of formula II to obtain dyes having the general structure:

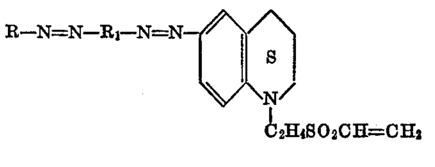

wherein R, $R_1$ and the tetrahydroquinoline system are optionally substituted as described in the table.

| Example No. | Substituents on R | Substituents on $R_1$ | Substituents on tetrahydroquinoline ring system [1] | | Color on nylon |
|---|---|---|---|---|---|
| 10 | 2-$CH_3$ | 2-$CH_3$ | 7-$CH_3$ | 2-$CH_3$ | Red. |
| 11 | 3-acetamido | 2,5-di-$OCH_3$ | 7-$CH_3$ | 2-$CH_3$ | Violet. |
| 12 | 4-$CH_3$ | 3-$CH_3$ | 7-$CH_3$ | 2-$CH_3$ | Red. |
| 13 | 3-$CH_3$ | 3-$CH_3$ | 7-$CH_3$ | 2-$CH_3$ | Red. |
| 14 | 4-$OCH_3$ | 3-$CH_3$ | 7-$CH_3$ | None | Red. |
| 15 | 4-Cl | 3-$CH_3$ | 7-$CH_3$ | do | Red. |
| 16 | 4-$CH_3$ | 3-$CH_3$-6-$OCH_3$ | 7-$CH_3$ | do | Red. |
| 17 | None | 2-Cl | 7-$CH_3$ | do | Red. |
| 18 | do | None | 7-$CH_3$ | 2,2,4-tri-methyl | Red. |
| 19 | do | 2,5-dimethoxy | 7-$CH_3$ | do | Violet. |
| 20 | do | None | 7-$CH_3$ | 2-isopropyl | Red. |
| 21 | do | do | 7-Cl | do | Red. |
| 22 | do | do | 7-acetamido | do | Red. |
| 23 | do | do | 7-$OCH_3$ | 2-$CH_3$ | Red. |
| 24 | 3-$CH_2OH$ | 2,5-dimethoxy | 7-$CH_3$ | 2-$CH_3$ | Violet. |
| 25 | 4-$NO_2$ | 3-$CH_3$ | 7-Cl | 2-$CH_3$ | Orange. |
| 26 | 4-$SO_2NH_2$ | 2-Cl | 7-Cl | 2-$CH_3$ | Do. |
| 27 | 4-$NHCOCH_3$ | 3-$CH_3$ | 7-$CH_3$ | 2-$CH_3$ | Red. |
| 28 | 4-$SO_2CH_3$ | 3-Cl | None | None | Orange. |
| 29 | None | None | do | do | Do. |
| 30 | do | do | 5-$CH_3$ | 2-$CH_3$ | Do. |
| 31 | 4-$N(C_2H_4OH)_2$ | do | 7-$CH_3$ | 2-$CH_3$ | Red. |

[1] Other disazo compounds can be prepared where the substituent in the left column is present in the 5-, 7- or 8-position and the substituent in the right column is present in the 2-, 3- or 4-position.

The disazo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the disazo compounds of the invention can be used to dye polyester textile materials.

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc., 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried. Accordingly, since the disazo compounds of the invention are water-insoluble, they can be applied from aqueous dispersions in the manner of the so-called "dispersed dyes." However, coloration can also be effected, for example, by incorporating the disazo compound into the spinning dope and spinning the fiber as usual. The disazo compounds of our invention have varying utility as dyes. The degree of utility varies, for example, depending upon the material being dyed and the formula of the disazo compound. Thus, for example, all the dyes will not have the same degree of utility for the same material. The substituents on the R, $R_1$ and tetrahydroquinoline rings serve primarily as auxochrome groups to control the color of the disazo compound.

Polymeric linear polyester materials of the terephthalate type are illustrative of the linear aromatic polyester textile materials than can be dyed with the new disazo compounds of our invention. The terephthalate fibers sold under the trademarks "Kodel," "Dacron," and "Terylene," for example, in the form of filaments, yarn and fabric, for example, are illustrative of the polyester textile materials than can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363 for example, can be dyed. The linear aromatic polyester materials specifically named have a melting point of at least 200° C.

Nylon, in fiber, yarn and fabric form, is representative of polyamides which can be dyed with the disazo compounds.

What we claim is:

1. A water-insoluble disazo compound having the formula

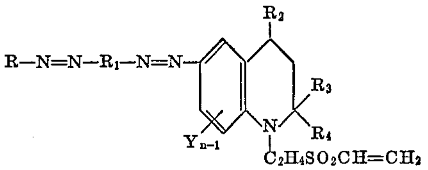

wherein:

R is phenyl or phenyl substituted with methyl, methoxy, chlorine, bromine, hydroxymethyl, nitro, methylsulfonyl, methylsulfonamido, trifloromethyl, acetamido, cyano, carboxamido, thiocyano, methylthio, formyl, carbethoxy, benzoyl or sulfamoyl $R_1$ is p-phenylene or p-phenylene substituted with lower alkyl, lower alkoxy, chloro, bromo, lower alkylthio, lower alkanoylamido benzamido, or lower alklysulfonamido;

$R_2$, $R_3$, and $R_4$ are the same or different and each is hydrogen or lower alkyl;

Y is lower alkyl, lower alkoxy, chlorine, bromine, or lower alkanoylamido and

*n* is a positive integer from 1 to 4.

2. A compound according to claim 1 wherein $R_2$, $R_3$, $R_4$ and Y are lower alkyl; and *n* is 2.

3. The compound

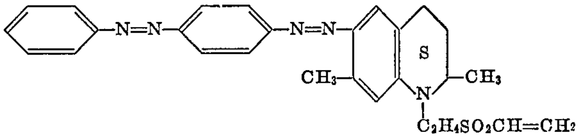

4. The compound

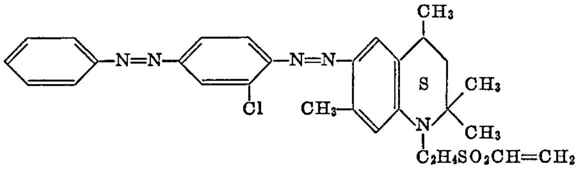

5. The compound

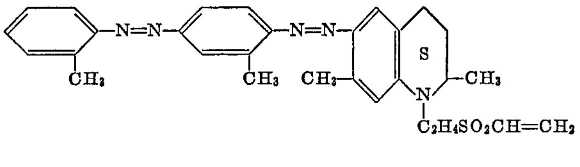

6. The compound

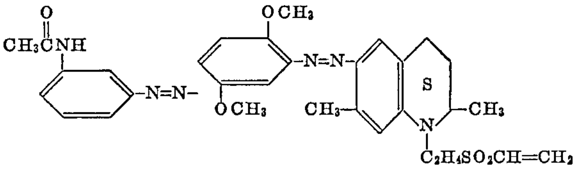

7. The compound

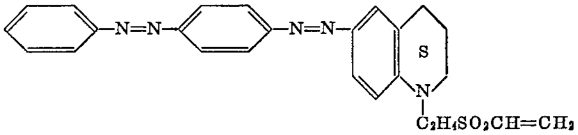

8. The compound

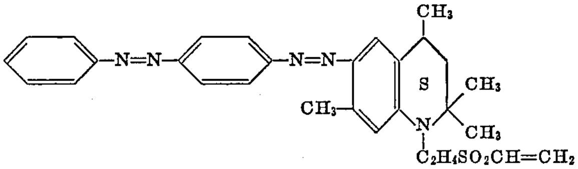

9. The compound

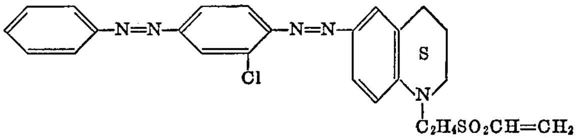

10. The compound

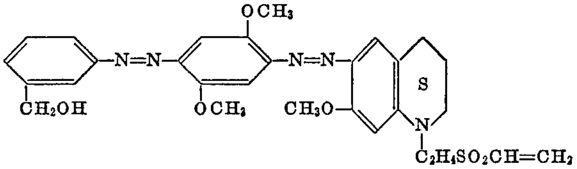

References Cited

UNITED STATES PATENTS 2,784,204 3/1957 Heyna et al. ------ 260—155 X

CHARLES B. PARKER, Primary Examiner

D. M. PAPUGA, Assistant Examiner

U.S. Cl. X.R.

8—41, 55; 260—37, 283